US012811390B2

(12) United States Patent
Compton et al.

(10) Patent No.: US 12,811,390 B2
(45) Date of Patent: Nov. 24, 2026

(54) SYSTEM AND METHOD FOR PROTECTING ELECTRICAL CIRCUITS

(71) Applicant: GE Aviation Systems Limited, Cheltenham (GB)

(72) Inventors: Russell Mark Compton, Droitwich Spa (GB); Michael Glenny, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 346 days.

(21) Appl. No.: 18/433,994

(22) Filed: Feb. 6, 2024

(65) Prior Publication Data

US 2025/0253645 A1 Aug. 7, 2025

(51) Int. Cl.
*H02H 9/00* (2006.01)
*H02H 1/00* (2006.01)

(52) U.S. Cl.
CPC ............ *H02H 9/00* (2013.01); *H02H 1/0007* (2013.01)

(58) Field of Classification Search
CPC ........................................................ H02H 9/00
See application file for complete search history.

(56) References Cited

U.S. PATENT DOCUMENTS 5,734,256 A * 3/1998 Larsen .................. H02H 7/122 323/207
6,671,149 B1 12/2003 Chea, Jr.
7,145,757 B2 * 12/2006 Shea ...................... H02H 3/023 361/10
7,643,256 B2 1/2010 Wright
8,072,723 B2 12/2011 Premerlani
9,076,607 B2 7/2015 Premerlani et al.
10,205,313 B2 2/2019 Creech
10,770,883 B2 9/2020 Creech
11,005,254 B2 5/2021 Handy et al.
11,682,868 B2 6/2023 Wiegman
11,784,500 B1 * 10/2023 Richter ..................... H02J 7/64 361/1
2018/0375505 A1 * 12/2018 Handy ................. H03K 17/082
2023/0135066 A1 5/2023 Wiegman
2024/0007040 A1 * 1/2024 Trainer ................... H02J 1/082

FOREIGN PATENT DOCUMENTS

EP 3609030 B1 4/2022
FR 3127024 3/2023
FR 3127025 3/2023
FR 3127269 3/2023
FR 3129375 5/2023
(Continued)

*Primary Examiner* — Stephen W Jackson
(74) *Attorney, Agent, or Firm* — Thomas | Horstemeyer, LLP

(57) ABSTRACT

A system includes a circuit protection device (CPD) having an input coupled to an aircraft power generator and an output coupled to an aircraft electrical load. A shorting switch is coupled to the input of the CPD. The shorting switch, when closed, provides a fault current path that returns to the aircraft power generator and avoids passing through the CPD and the aircraft electrical load. A controller, based upon the voltage measurements from one or more voltage sensors and current measurements from at least one current sensor selectively opens and closes one or more of the CPD and the shorting switch.

20 Claims, 7 Drawing Sheets

(56) References Cited

FOREIGN PATENT DOCUMENTS

| | | |
|---|---|---|
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

* cited by examiner

SYSTEM AND METHOD FOR PROTECTING ELECTRICAL CIRCUITS

TECHNICAL FIELD

The present disclosure relates generally to approaches for protecting electrical circuits such as switching circuits.

BACKGROUND

Switching circuits are used to switch current, voltage, and power in electrical circuits. For example, these types of circuits can be used in aircraft to switch current, voltage, and power between a voltage source and aircraft systems and components. Sometimes electrical shorts occur within the aircraft and these sometimes create voltage or current surges that may damage switches in the switching circuits. To prevent damage, circuit protection devices can be used.

BRIEF DESCRIPTION OF THE DRAWINGS

Various needs are at least partially met through provision of the method and apparatus for protecting electrical devices such as switches, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
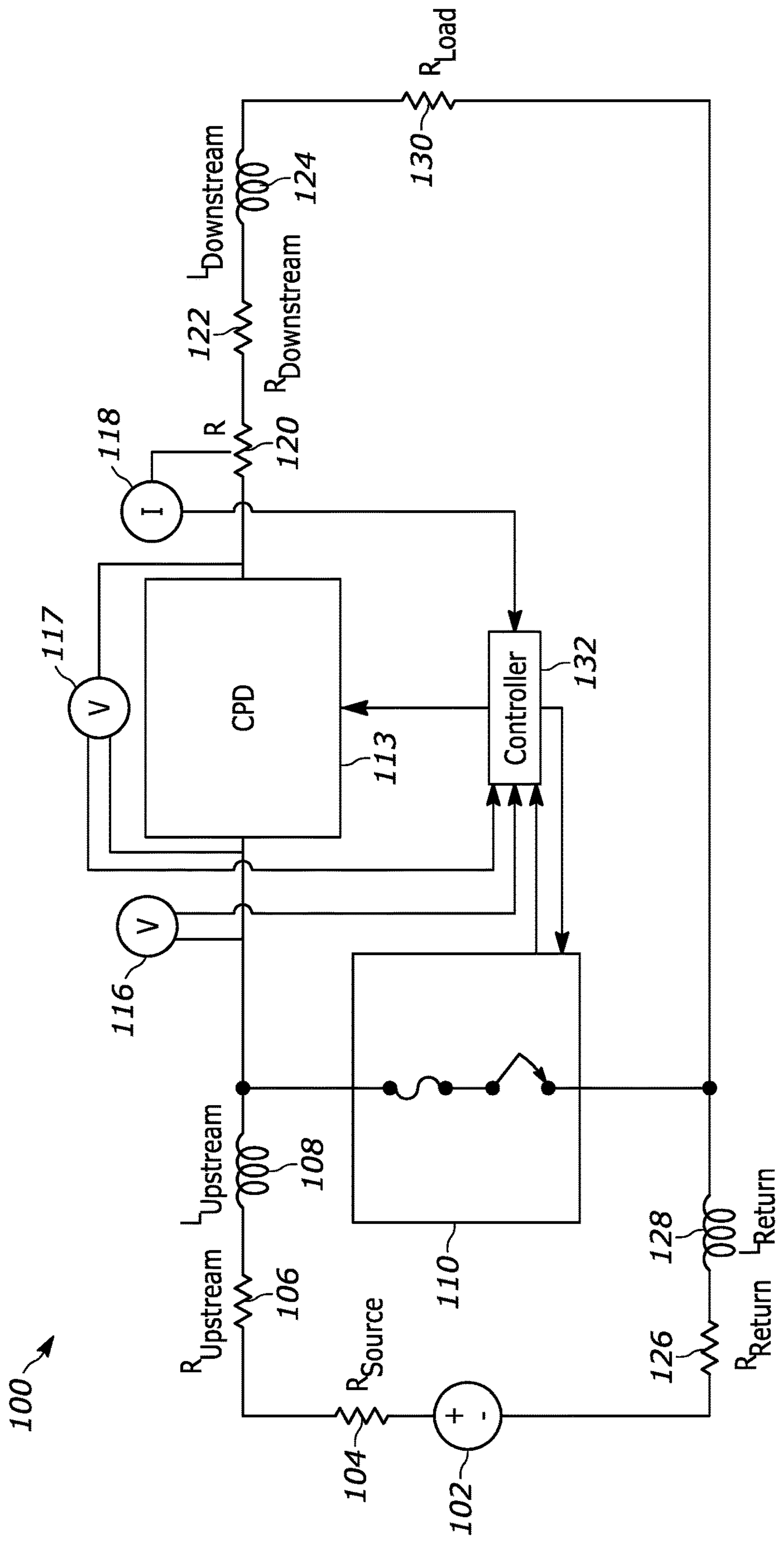
FIG. 1 depicts a circuit diagram of a system that includes circuit protection devices in accordance with various embodiments of the present disclosure.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The approaches provided herein provide circuit protection devices and structures that prevent damage to sensitive switching devices (sometimes referred to herein as main switching devices or circuit protection devices (CPDs)) deployed within power supply systems. In these regards and as will be described herein, a shorting switch is used to divert rupture or fault current away from a main switching device or CPD during a short circuit event.

In many power distribution systems, each load is typically protected by a CPD, which may be a simple electro-mechanical circuit breaker, contactor, relay, SSPC (Solid State Power Controller), or micro electrical mechanical system (MEMS) switch to mention a few examples. During a fault condition (e.g., a short circuit), the CPD interrupts the fault current, which can be orders of magnitude greater than its rated operating current. This operation causes rapid component wear out. One feature of these fault events is that the di/dt (change in current over time) can be very high, for example, where the loop inductance is low, or the pre-existing current in the circuit is high. Consequently, by the time a CPD trips, the magnitude of the current can reach extremely high peaks and damage the CPD.

In one example, the CPD (e.g., an electro-mechanical circuit breaker, contactor, relay, SSPC, or MEMS device or switch) is connected serially to an aircraft electrical load. The CPD protects the aircraft electrical load from short circuit events. A shorting switch is connected electrically in parallel to the CPD and aircraft electrical load and provides a path for the rupture and shorting current away from the CPD during the shorting event.

In another example, the CPD may include a bypass switch connected electrically in parallel to a MEMS device (referred to herein sometimes as a hybrid switch or CPD). The bypass switch diverts some current away from the MEMS device during a short circuit event. A shorting switch is utilized to temporarily divert other amounts of current away from the MEMS device and the bypass switch during the short-circuit event. This structure and operation reduces the amount of rupture or shorting current seen by the entire CPD (bypass switch and MEMS device) during a short-circuit event and thereby reduces the corresponding voltage drop produced across the MEMS device when MEMS device trips open. Because this voltage drop is significantly reduced in magnitude, resultant damage or wear to the MEMS device is prevented, reduced, or minimized.

The main switching element or CPD provides a balance of low on-resistance, and high rupture current capability. In contrast, the shorting switch has a high rupture-current capability and also an ‘on’ resistance (that together with that of an optional fuse), is less than or at least comparable with that of the main switching element or CPD, in order to divert a significant proportion of the fault current in the event of a short circuit event.

It will be appreciated that a single shorting switch could be provided per CPD, or for groups of CPDs. For example, an electronic circuit breaker panel may have a single switch or groups may have a single switch.

Advantageously, the approaches provided herein reduce wear on the CPD during short-circuit faults, extending their lifetime. These approaches contribute to the feasibility of novel switching devices that would otherwise struggle to handle extreme short-circuit faults. Although the shorting switches might in some circumstances be physically larger higher-rated device than the bypass switch, it allows the bypass switch to be of a lower rating, thereby reducing costs. Thus, in a system where one shorting switch serves multiple parallel switches, there can be a substantial overall saving in terms of the physical size and cost of the system.

Furthermore, these approaches provide a short-circuit action of the shorting switch (which need only be temporary) that protects the CPD (e.g., a MEMS device and bypass switch) from excessive transient voltage and/or current during load switching, inrush and overload/fault conditions.

The shorting switch can protect multiple switches, allowing the latter to be lower-rated thereby reducing weight & size of the overall system. In addition, the high short-circuit current can pass through the shorting switch for longer period due to a fault and this can be used to more reliably trigger an upstream protection device.

As mentioned above, these approaches have particular advantages when the CPDs are or include MEMS devices. MEMS devices have very low on-resistance (e.g., 10 milliohms for a 10 A rated device) and are very well suited to carrying current, but are unable to switch current without risk of damage unless the voltage across the MEMS device is kept very low during the switching action. In contrast to a contactor, which has a substantial thermal capacity to withstand arcing at the contacts during switching, a MEMS device does not and would be destroyed by such an operation. Hence, they are used in combination with solid state switching devices (bypass switches) to form a hybrid switch. The voltage drop across the switch and/or current through the switch during a short circuit can still be sufficient to damage the MEMS device. The present approaches provide mitigation by introducing the additional shorting switch that diverts a significant portion (e.g., about 85 percent) of the fault current away from the MEMS device during a short circuit event drastically reducing the chance of damaging the MEMS device.

In many of these embodiments, a system includes a circuit protection device (CPD) having an input coupled to an aircraft power generator and an output coupled to an aircraft electrical load. The system also includes a shorting switch connected to the input of the CPD. The shorting switch, when closed, provides a fault current path that returns to the aircraft power generator and avoids passing through the CPD and the aircraft electrical load. The system further includes a controller coupled to the CPD, the shorting switch, one or more voltage sensors, and a current sensor. The controller is configured to receive voltage measurements from the voltage sensors and current measurements from the current sensor. In aspects, one voltage sensor is coupled to the input of the CPD and another voltage sensor is coupled between the input and output of the CPD. The current sensor is coupled to the output of the CPD. Based upon the voltage measurements and the current measurements, the controller can selectively open and close one or more of the CPD and the shorting switch.

In aspects, the CPD comprises a bypass switch and a micro electrical mechanical system (MEMS) device. In other aspects, the CPD comprises a metal-oxide-semiconductor field-effect transistor (MOSFET) switch.

In examples, the aircraft power generator is an aircraft engine, converter, or a battery. Other examples are possible.

In further examples, the aircraft electrical load is a pump, a heating element, or electrical distribution equipment. Other examples are possible.

In others of these embodiments, a system includes a micro-electrical-mechanical system (MEMS) device, a bypass switch, a shorting switch, and a controller. The MEMS device has an input coupled to an aircraft power generator and an output coupled to an aircraft electrical load. The bypass switch is connected electrically in parallel with the MEMS device. The bypass switch, when closed, provides a first alternative current path around the MEMS device. The shorting switch is connected to the input of the MEMS device and an input of the bypass switch. The shorting switch, when closed, provides a second alternative current path that returns to the aircraft power generator and avoids the CPD and the aircraft electrical load. The controller is coupled to the bypass switch, the shorting switch, one or more voltage sensors, the MEMS device, and one or more current sensors. The controller is configured to receive voltage measurements from the voltage sensors and current measurements from the current sensors. In aspects, one voltage sensor is coupled to the input of the MEMS device and another voltage sensor coupled between the input of the CPD and the output of the CPD. The current sensor is coupled to the output of the MEMS device; based upon the voltage measurements and the current measurements selectively open and close one or more of the MEMS device, bypass switch and the shorting switch.

In examples, the bypass switch is a MOSFET. In other examples, the shorting switch is an insulated gate bipolar transistor (IGBT).

In some aspects, the aircraft power generator is a generator that derives power from an aircraft engine via an accessory gearbox, a power converter, or a battery. In other aspects, the aircraft electrical load is a pump, a heating element, or electrical distribution equipment.

In some examples, the controller further selectively opens and closes the MEMS device. In still other aspects, the controller compares the measured current to a first threshold and a second threshold in determining whether to open or close the bypass switch and the shorting switch. In yet other aspects, the controller compares the measured voltages to various thresholds in determining whether to open or close the bypass switch and the shorting switch.

In some other examples, the controller compares the measured current to a first threshold and a second threshold in determining whether to open or close the bypass switch and the shorting switch and wherein the controller compares the measured voltages to various thresholds in determining whether to open or close the bypass switch and the shorting switch.

In yet other examples, a fuse is connected electrically in series with the shorting switch.

In still others of these embodiments an approach is provided wherein a bypass switch is connected electrically in parallel with a micro-electrical-mechanical system (MEMS) device. The bypass switch, when closed, provides a first alternative current path around the MEMS device. The MEMS device has an input coupled to an aircraft power generator and an output coupled to an aircraft electrical load; providing a shorting switch that is connected to the input of the MEMS device and the input of the bypass switch. The shorting switch, when closed, provides a second alternative current path that returns to the aircraft power generator and avoids the CPD and the aircraft electrical load. At a controller, voltage measurements are received from one or more voltage sensors and current measurements are received from a current sensor. At the controller, based upon the voltage measurements and the current measurements, one or more of the MEMS device, the bypass switch and the shorting switch are selectively opened and closed.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description.

Referring now to FIG. 1, an example of a circuit protection system 100 is described. The system 100 includes or has an aircraft power source 102, a source resistance 104, a circuit protection device (CPD) 113, an upstream resistance 106, an upstream inductance 108, a shorting switch 110, a first voltage sensor 116, a second voltage sensor 117, a current sensor 118, a resistor 120, a downstream resistance 122, a downstream inductance 124, a return resistance 126, and a return inductance 128, an aircraft electrical load 130, and a controller 132.

The aircraft power source 102 may be an aircraft engine, battery, or other energy, voltage, current, and/or power source. The aircraft power source 102 may be also be a converter such as Transformer Rectifier Unit (TRU), Auto-TRU, DC-DC converter (e.g., for providing battery output regulation or DC bus conversion). The source resistance 104 represents the resistance of the aircraft power source and, in one example, is 3 milliohms.

The CPD 113 includes the switches and potentially circuit protection devices to protect the system 100 from the effects of a short circuit. In examples, the CPD 113 may be an electro-mechanical circuit breaker, contactor, relay, SSPC, or MEMS device or switch. The CPD 113 protects the aircraft electrical load 130 from short circuit events.

In another example, the CPD 113 includes a bypass switch connected electrically in parallel to a MEMS device (referred to herein sometimes as a hybrid switch). The bypass switch diverts some current away from the MEMS device during a short circuit event. This specific structure is described in greater detail with respect to FIG. 3 and FIG. 4.

The shorting switch 110 is connected electrically in parallel to the CPD 113 and aircraft electrical load 130 and provides a path for the rupture and shorting current away from the CPD 113 during the shorting event. In some aspects and when the shorting switch 110 is inadvertently activated or fails to open in a timely manner (within some predetermined time limit), it may cause an upstream protective device to trip, removing power from multiple outputs (e.g., the various outputs on a power distribution unit or panel). For this reason, a series fuse is provided in the shorting switch 110 to trip in the event of the shorting switch 110 failing short-circuit, isolating the fault to a single output. In other words, the fuse defends against an inadvertent closure of the shorting switch 110. When used to protect the CPD 113, the shorting switch 110 need only be active (closed) for very short periods, which will not result in the fuse blowing.

The first voltage sensor 116 is any type of voltage sensing device such as a voltmeter that measures the voltage at the input of the CPD 113. The second voltage sensor 117 is any voltage sensing device that measures voltage between the input of the CPD 113 and the output of the CPD 113. The current sensor 118 is any type of current sensing device that measures the current at the output of the CPD 113 through the resistor 120. Separate current monitors or sensors can be provided for any switches or devices in the CPD 113 and shorting switch 110 in order to adequately protect them and for providing fault detection/isolation in the event of a failure within one of the switches.

The upstream resistance 106, downstream resistance 122, and return resistance represent the resistance in the electrical path of the circuit shown. For example, these elements represent the resistance of wires or aircraft structures (when these provide the electrical path). Similarly, the upstream inductance 108, downstream inductance 124, and return inductance 128 represent the inductances in the electrical path of the circuit shown. For example, these elements represent the inductance of wires or aircraft structures (when these provide the electrical path).

The aircraft electrical load 130 is indicated by a resistance in the figure and represents any type of system or component in an aircraft that is supplied voltage, current, and/or power from the aircraft power source 102 via the CPD 113. For example, the aircraft electrical load 130 may be a pump, a heater, electrical distribution equipment, or any other aircraft element needing current, voltage, or power. Other examples of components and combinations of components are possible.

The controller 132 can be any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The controller 132 may be configured (for example, by using corresponding programming stored in a memory as will be well understood by those skilled in the art) to carry out one or more of the steps, actions, and/or functions described herein. The controller 132 may include a memory that includes computer instructions that implement any of the functions described herein.

The controller 132 is configured to obtain voltage readings from the first voltage sensor 116 and the second voltage sensor 117, current readings from the current sensor 118, and utilize one or more of these readings to determine when to actuate the shorting switch 110. In one example, when the voltage and/or current as measured by these devices exceeds given values, then the controller 132 sends a control signal that actuates the shorting switch 110. The control signal may actuate it for a predetermined amount of time or until certain voltage and/or current readings are sensed by the first voltage sensor 116, the second voltage sensor 117, and/or the current sensor 118.

Figure 2:
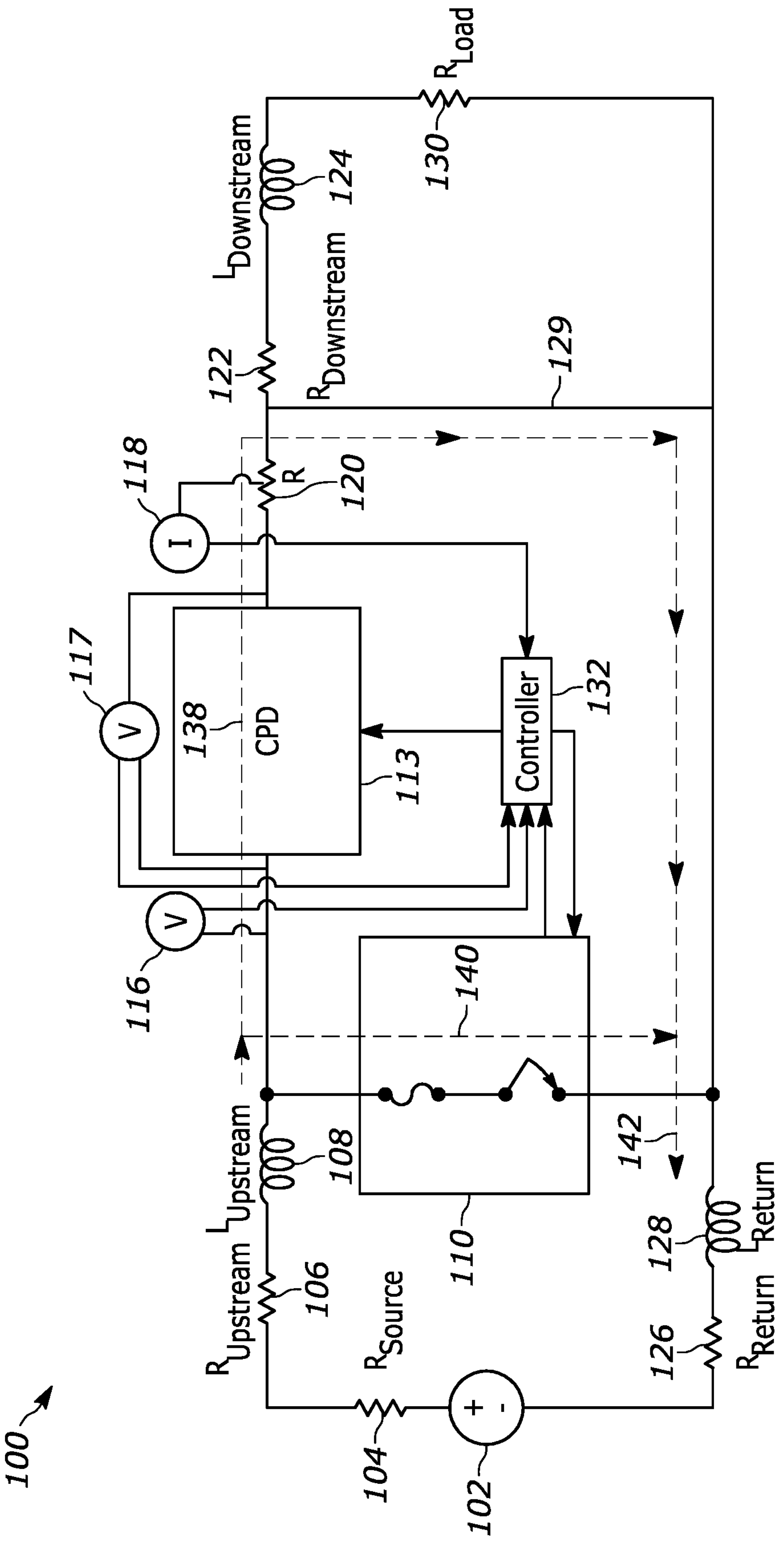
FIG. 2 depicts a circuit diagram of a system that includes a circuit protection device that has been actuated in accordance with various embodiments of the present disclosure.

Referring now to FIG. 2, one example of the circuit of FIG. 1 when the shorting switch 110 has been actuated is described. The circuit of FIG. 2 has the same elements as the circuit of FIG. 1 and these descriptions will not be repeated here.

As shown in FIG. 2, a short 129 has occurred. As a result, the controller 132 has actuated the CPD 113 and the shorting switch 110. Actuation may have occurred because the voltage sensed by the first voltage sensor 116, the second voltage sensor 117, and/or the current sensed by the current sensor 118 exceeded predetermined values.

The short 129 and the actuation of the CPD 113 and the shorting switch 110 create fault currents. More specifically, a first fault current 138 flows through the CPD 113 and the short 129. A second fault current 140 flows through the shorting switch 110. Thus, a total fault current 142 is created that is the sum of the first fault current 138 and the second fault current 140. In one example, the second fault current 140 is 85 percent of the total fault current 142. Since a significant amount of the total fault current 142 is diverted away from the CPD 113, this reduces the wear on the CPD 113 and/or lessens the chance that the CPD 113 will fail.

Figure 3:
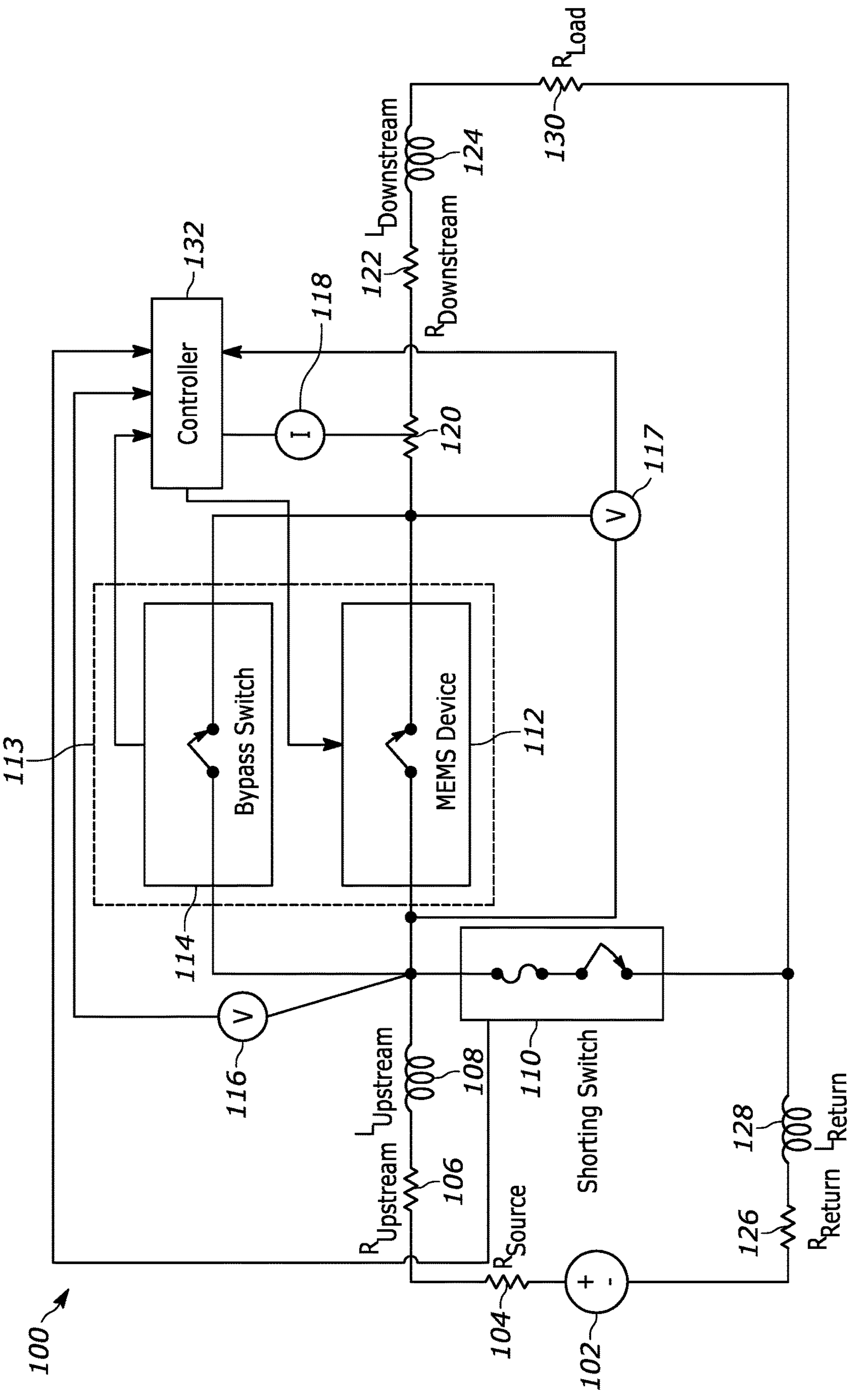
FIG. 3 depicts a circuit diagram of a system that includes circuit protection devices in accordance with various embodiments of the present disclosure.

Referring now to FIG. 3, another example of a circuit protection system 100 is described. The system 100 includes or has an aircraft power source 102, a source resistance 104, a CPD 113, an aircraft electrical load 130, and a controller 132, an upstream resistance 106, an upstream inductance 108, a shorting switch 110, a first voltage sensor 116, a second voltage sensor 117, a current sensor 118, a resistor 120, a downstream resistance 122, a downstream inductance 124, a return resistance 126, and a return inductance 128. These elements have already been described with respect to FIG. 1 and that description will not be repeated here.

The CPD 113 includes a micro electrical mechanical system (MEMS) device 112 and a bypass switch 114. The MEMS device 112 may be a single MEMS device or multiple MEMS devices or switches (e.g., configured in an array). The MEMS device 112 acts to selectively allow current, voltage and power to flow to the aircraft electrical load 130 when closed (e.g., during normal operation) and to disconnect current, voltage, and power to the aircraft electrical load 130 when open (because of a fault event such as a short circuit). The bypass switch 114 (along with the shorting switch 110) are selected actuated by the controller 132 to move current away from the MEMS device 112 during a short circuit event occurring in the system 100 thereby allowing the MEMS device 112 to be opened. Separate current monitors or sensors can be provided for the bypass switch 114, the MEMS device 112, and shorting switch 110 in order to adequately protect them and for providing fault detection/isolation in the event of a failure within one of the switches.

As mentioned above, these approaches have particular advantages when the CPDs are or include MEMS devices such as the MEMS device 112. The MEMS device 112 has a very low on-resistance (e.g., 10 milliohms for a 10 A rated device) and is very well suited to carrying current, but is unable to switch current without risk of damage unless the voltage across the MEMS device 112 is kept very low during the switching action. The voltage drop across the CPD 113 during a short circuit can still be sufficient to damage the MEMS device 112, for example, when the MEMS device 112 is opened. Hence, the bypass switch 114 is used to divert some current away from the MEMS device 112 and, in addition, the shorting switch 110 diverts other fault current produced because of a short circuit. It will be appreciated that a significant portion (e.g., about 85 percent) of the total fault current is directed away from the MEMS device 112 by the shorting switch 110 during a short circuit event greatly reducing the chance of damaging the MEMS device 112.

Figure 4:
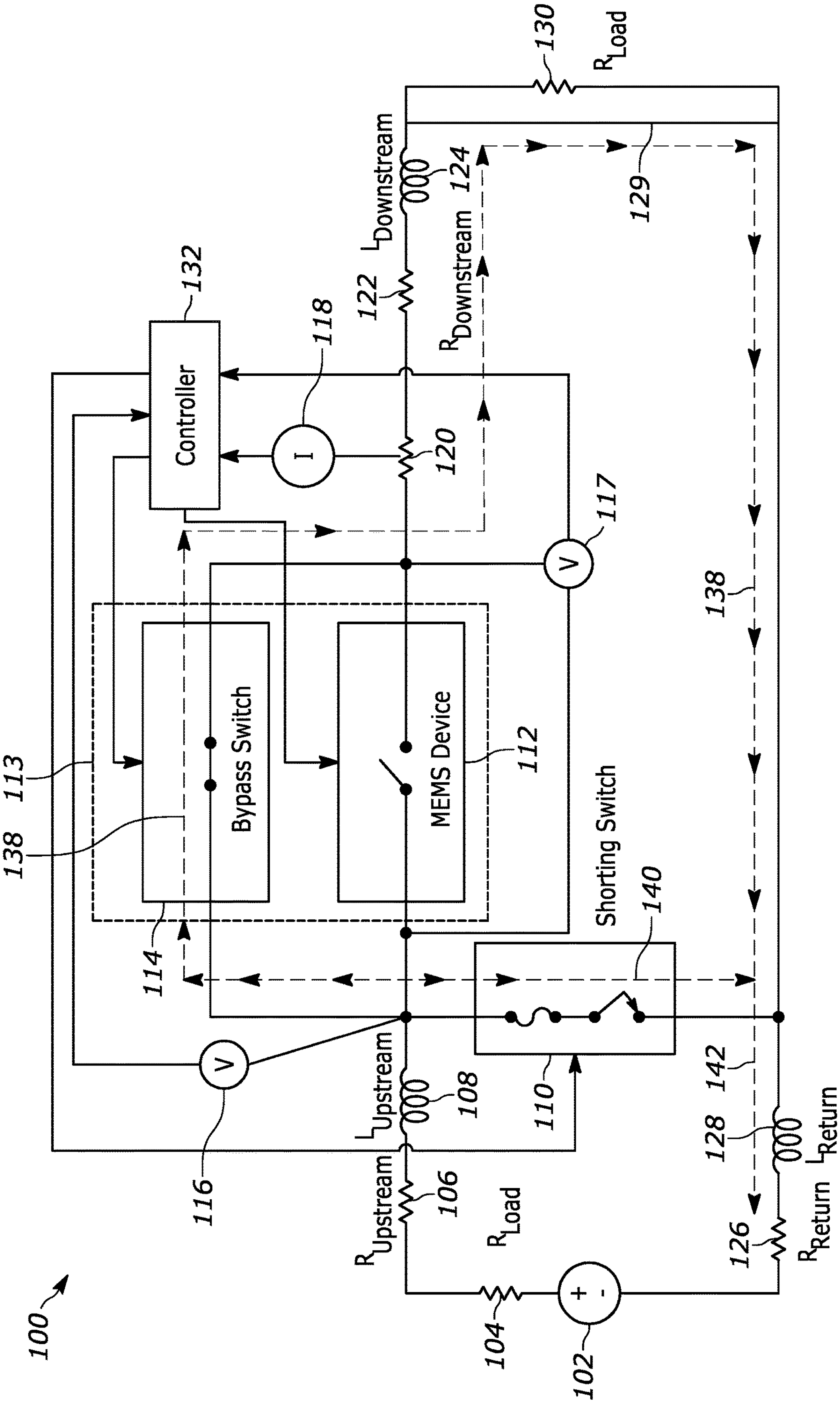
FIG. 4 depicts a circuit diagram of a system that includes a circuit protection device that has been actuated in accordance with various embodiments of the present disclosure.

Referring now to FIG. 4, one example of the circuit of FIG. 3 when the shorting switch 110 and the bypass switch 114 have been actuated is described. The circuit of FIG. 4 has the same elements as the circuit of FIG. 3 and these descriptions will not be repeated here.

As shown in FIG. 4, a short 129 has occurred. As a result, the controller 132 has actuated the bypass switch 114 of the CPD 113 and the shorting switch 110. FIG. 4 also shows the MEMS device 112 is open. Actuation of the bypass switch 114 and the shorting switch 110 may have occurred because the voltage sensed by the first voltage sensor 116, the second voltage sensor 117, and/or the current sensed by the current sensor 118 exceeded predetermined values. Examples of approaches for determining when to open and close the bypass switch 114 and/or the shorting switch 110 are described below with respect to FIG. 5 and FIG. 7.

The short 129 and the actuation of the bypass switch 114 and the shorting switch 110 direct fault currents through the system 100. More specifically, a first fault current 138 flows through the bypass switch 114 and across the short 129. A second fault current 140 flows through the shorting switch 110. Thus, a total fault current 142 is created that is the sum of the first fault current 138 and the second fault current 140. In one example, the second fault current 140 is 85 percent of the total fault current 142. Since a significant amount of the total fault current 142 is diverted away from the MEMS device 112, this reduces the wear on the MEMS device 112 and/or lessens the chance that the MEMS device 112 will fail due to the short circuit event.

Figure 5:
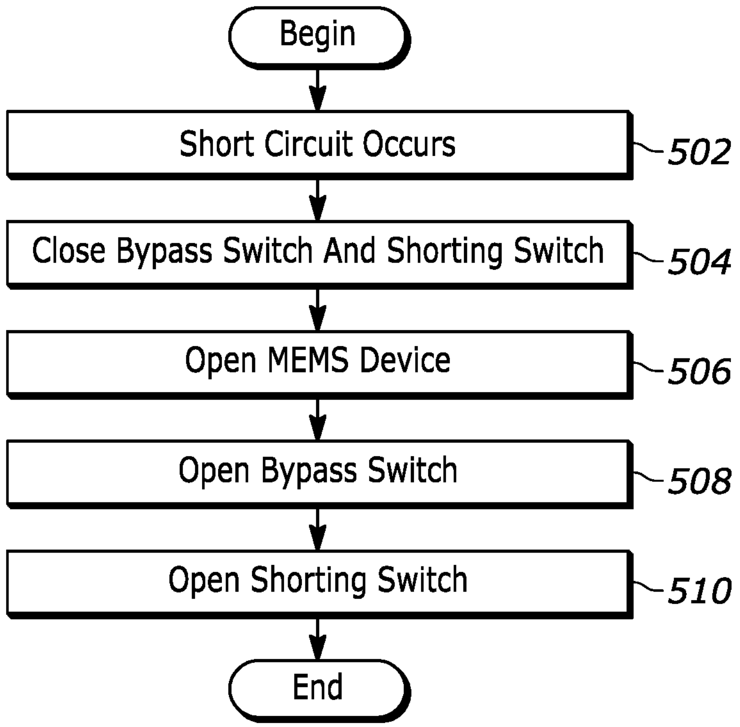
FIG. 5 depicts a flowchart of an approach for providing circuit protection in accordance with various embodiments of the present disclosure.

Referring now to FIG. 5, one example of an approach for operating CPDs is described. In this example, it is assumed that the system described with respect to FIG. 3 and FIG. 4 is being operated. Initially, the MEMS device is already closed and passing current normally to the aircraft electrical load. The bypass switch and shorting switch are open.

At step 502, a short circuit or other fault condition occurs. In examples, the short circuit occurs in an aircraft electrical system.

At step 504, the bypass switch 114 is closed and the shorting switch 110 is closed. Closing of bypass switch 114 and shorting switch 110 may be made at the same time or around the same time. Current is diverted away from the MEMS device 112 by both the shorting switch 110 and the bypass switch 114.

At step 506, the MEMS device 112 is opened. Because of the current diversion, a high voltage has not developed across the MEMS device 112. Consequently, the MEMS device 112 can be opened.

At step 508, the bypass switch 114 is opened. This may occur at some predetermined time after the MEMS device 112 has opened such as about 5 microseconds after the MEMS device 112 was opened.

At step 510, the shorting switch 110 is opened. This may occur at some predetermined time after the MEMS device 112 has opened such as about 6 microseconds after the MEMS device 112 was opened.

Figure 6:
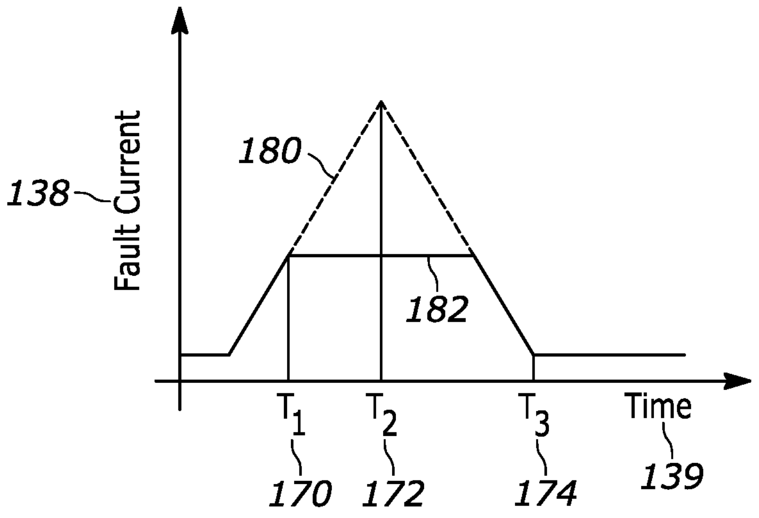
FIG. 6 depicts a waveform diagram showing fault current using in accordance with various embodiments of the present disclosure.

Referring now to FIG. 6, an example waveform showing the first fault current 138 going across the short 129 is described. This example shows the first fault current 138 within the circuit of FIG. 4.

The first fault current 138 is shown along the y-axis and time 139 is shown along the x-axis. In the case where there is no shorting switch 110, a fault current waveform 180 rises to reach a peak value at time T2 (172) and falls back to some nominal value by time (T3) 174.

In contrast, when there is a shorting switch 110 in the circuit, a waveform 182 is produced. As a result of the inclusion of the shorting switch 110, the current through the CPD 113 rises initially but at time (T1) 170, the waveform 182 levels off to a steady or nearly steady value before returning to a nominal value at time (T3) 174. The current through the CPD 113 should ultimately fall to zero as the CPD 113 has opened in response to the fault.

Figure 7:
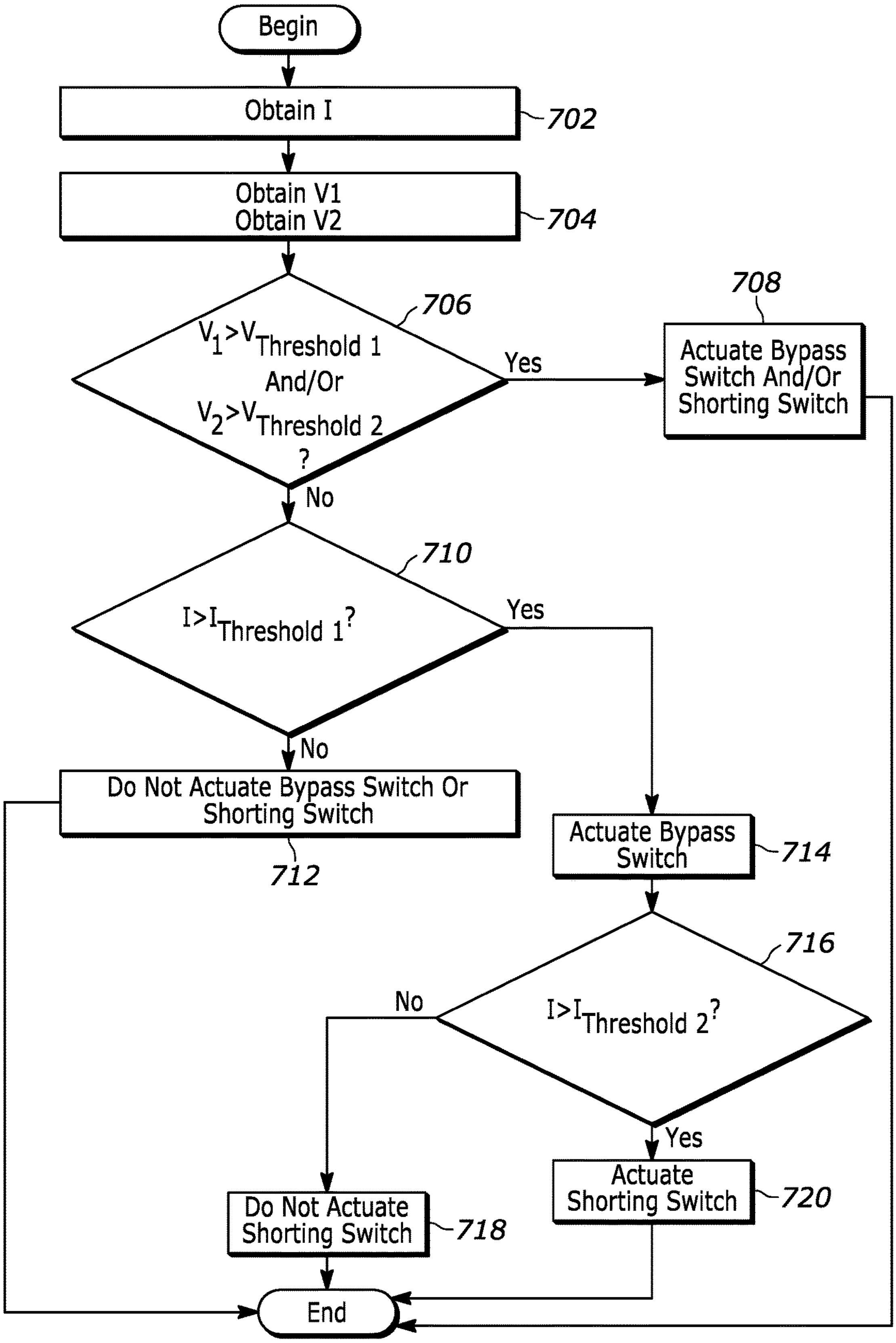
FIG. 7 depicts a flowchart showing the operation of a controller in accordance with various embodiments of the present disclosure.

Referring now to FIG. 7, one example of an approach for closing the bypass switch 114 and the shorting switch 110 of FIG. 3 and FIG. 4 under fault conditions is described. This approach can be implemented, in aspects, by computer instructions executed by a processing device. Initially, the MEMS device is closed.

At step 702, the current coming from the CPD 113 as measured by current sensor 118 is obtained. At step 704, a first voltage at the input of the CPD 113 as measured by the first voltage sensor 116 is obtained and a second voltage between the input and output of the CPD 113 as measured by the second voltage sensor 117 is obtained.

At step 706, a determination is made as to whether the measured first voltage is greater than a first threshold voltage (Vthresh1) and/or the second measured voltage is greater than a second threshold voltage (Vthresh2). If the answer is affirmative, then execution continues with step 708. If the answer is negative, then execution continues with step 710. The thresholds can be determined by experiment, for example.

At step 708, the bypass switch 114 and/or the shorting switch 110 are actuated. The determination of which of the switches 110 and/or 114 to actuate may depend upon the level of the measured voltage with some voltages requiring just the bypass switch be actuated and other voltages requiring that both of the switches 110 and/or 114 be actuated. Execution then ends.

At step 710, a determination is made as to whether the measured current is greater than a first threshold current (Ithresh1). If the answer is affirmative, execution continues with step 714. If the answer is negative, execution continues with step 712.

At step 714, the bypass switch 114 is actuated (closed). Next, at step 716, a determination is made as to whether the measured current is greater than a second threshold current (Ithresh2). Ithresh 2 is greater than Ithresh1. If the answer at step 716 is affirmative, then execution continues at step 720. If the answer at step 716 is negative, then execution continues at step 718.

At step 718, the shorting switch 110 is held in a non-actuated (open) state. Execution then ends.

At step 720, the shorting switch 110 is actuated (closed). Execution then ends.

At step 712, the state of the switches is held as-is. In other words, neither the bypass switch 114 nor the shorting switch 110 are actuated. Execution then ends.

Figure 8:
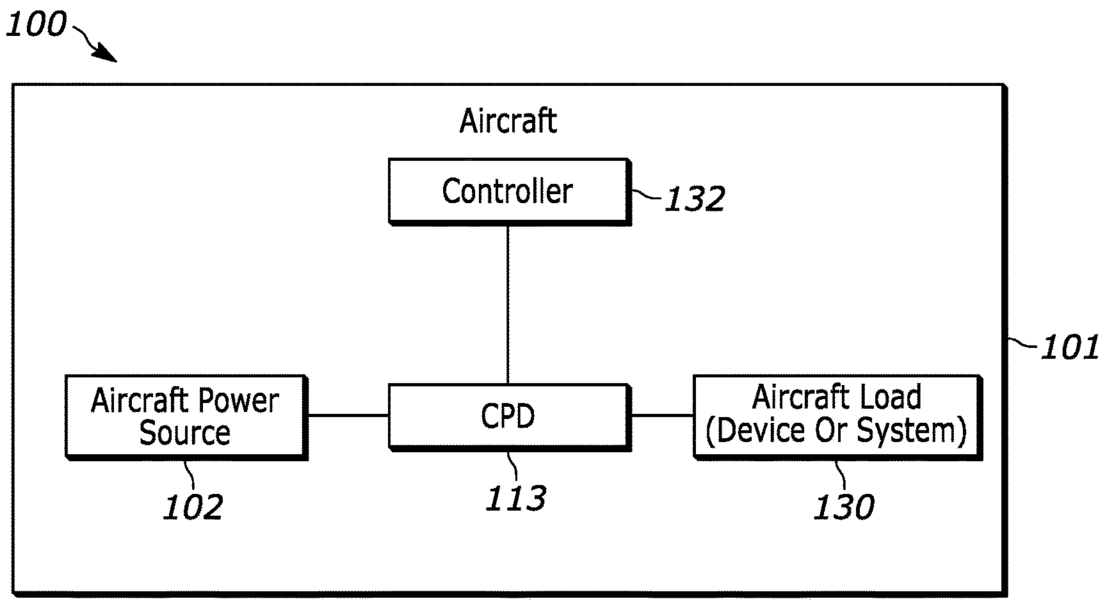
FIG. 8 depicts a system diagram showing the approaches deployed in an aircraft in accordance with various embodiments of the present disclosure.

Referring now to FIG. 8, one example of the circuit protection system 100 is described. The example of FIG. 8 is a simplified version of the systems of FIG. 1, FIG. 2, FIG. 3, and FIG. 4. An aircraft 101 includes an aircraft power source 102, a CPD 113, a controller 132, and an aircraft electrical load 130. These elements have been described previously and these descriptions will not be repeated here. Other elements shown in FIG. 1, FIG. 2, FIG. 3, and FIG. 4 are omitted for simplicity.

The aircraft 101 may be any type of aircraft such as a jet aircraft, helicopter, or the like. The aircraft 101 may include an aircraft frame, wings, engines, and other aircraft systems. The aircraft power source 102 may be a generator powered by one of the engines or in other examples may be a battery. Other examples of power sources are possible.

Couplings or connections between the elements may be any appropriate coupling or pathway such as wires. In other examples, the structure of the aircraft 101 itself may be part of the couplings. The aircraft electrical load 130 may be any other element, component, and/or system within the aircraft including heaters, pumps, generators lighting systems, electrical systems, sound systems, or communication systems to mention a few examples.

Figure 9:
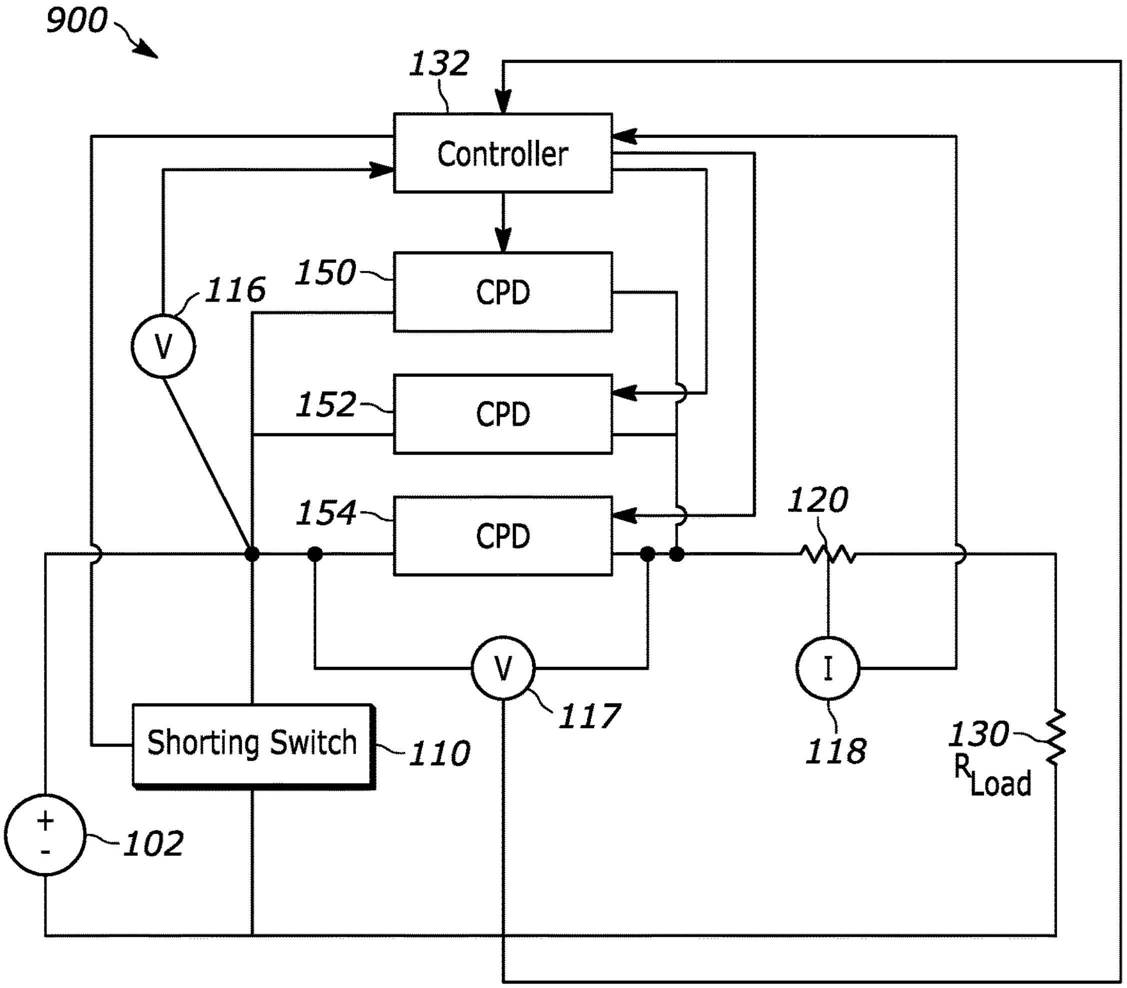
FIG. 9 depicts a circuit diagram of another circuit protection system in accordance with various embodiments of the present disclosure.

Referring now to FIG. 9, one example of a system 900 with multiple CPDs is described. As with the system shown in FIG. 1 and FIG. 2, the system 900 includes the aircraft power source 102, shorting switch 110, a first voltage sensor 116, a second voltage sensor 117, a current sensor 118, resistor 120, aircraft electrical load 130, and controller 132. Other elements shown in FIG. 1 and FIG. 2 may be included in the system of FIG. 9, but have been omitted from FIG. 9 for sake of simplicity. These elements have been described with respect to the examples of FIG. 1 and FIG. 2 and that description will not be repeated here.

Rather than a single CPD 113 (as shown in FIG. 1 and FIG. 2), the system of FIG. 9 includes a first CPD 150, a second CPD 152, and a third CPD 154. Although all of the first CPD 150, the second CPD 152, and the third CPD 154 are shown connected to a single aircraft electrical load 130, it will be appreciated that each of the first CPD 150, the second CPD 152, and the third CPD 154 may be connected to a separate aircraft electrical load. In this case, the voltage across and the current through each of the first CPD 150, the second CPD 152, and the third CPD 154 may be measured separately.

In operation, the controller 132 controls the operations of the first CPD 150, the second CPD 152, the third CPD 154, and the shorting switch 110 based upon the measured voltage from the first voltage sensor 116, measured voltage from the second voltage sensor 117, and the measured current from the current sensor 118.

It should now be understood that circuit protection devices and structures are provided that prevent damage to sensitive switching devices (sometimes referred to herein as main switching devices or circuit protection devices (CPDs)) deployed within power supply systems. In aspects, a shorting switch is used to divert rupture or fault current away from a main switching device or CPD during a short circuit event.

Further aspects of the present disclosure are provided by the subject matter of the following clauses:

A system, the system comprising: a circuit protection device (CPD) having an input coupled to an aircraft power source and an output coupled to an aircraft electrical load; a shorting switch coupled to the input of the CPD, wherein the shorting switch, when closed, provides a fault current path that returns to the aircraft power source and avoids passing through the CPD; a controller coupled to the CPD, the shorting switch, at least one voltage sensor, and at least one current sensor, the controller configured to: receive voltage measurements from at least one voltage sensor and current measurements from at least one current sensor; and based upon the voltage measurements and the current measurements selectively open and close one or more of the CPD and the shorting switch.

The system of any of the preceding clauses, wherein the CPD comprises a bypass switch and a micro electrical mechanical system (MEMS) device.

The system of any of the preceding clauses, wherein the CPD comprises a MOSFET switch.

The system of any of the preceding clauses, wherein the aircraft power source is a generator converter, or a battery.

The system of any of the preceding clauses, wherein the aircraft electrical load is a pump, a heating element, or electrical distribution equipment.

The system of any of the preceding clauses, wherein the shorting switch is an insulated gate bipolar transistor (IGBT) or metal-oxide-semiconductor field-effect transistor (MOSFET).

The system of any of the preceding clauses, wherein the voltage sensors comprise a first sensor coupled to the input of the CPD and a second sensor coupled between the input of the CPD and the output of the CPD.

A system, the system comprising: a micro-electrical-mechanical system (MEMS) device having an input coupled to an aircraft power source and an output coupled to an aircraft electrical load; a bypass switch coupled electrically in parallel with the MEMS device, the bypass switch, when closed, providing a first alternative current path around the MEMS device; a shorting switch coupled to the input of the MEMS device and an input of the bypass switch, wherein the shorting switch, when closed, provides a second alternative current path that returns to the aircraft power source and avoids the MEMS device and the aircraft electrical load; a controller coupled to the bypass switch, the shorting switch, at least one voltage sensor, the MEMS device, and the at least one current sensor, the controller configured to: receive voltage measurements from at least one voltage sensor and current measurements from at least one current sensor; and based upon the voltage measurements and the current measurements selectively open and close one or more of the MEMS device, bypass switch and the shorting switch.

The system of any of the preceding clauses, wherein the bypass switch is a MOSFET.

The system of any of the preceding clauses, wherein the shorting switch is an insulated gate bipolar transistor (IGBT) or metal-oxide-semiconductor field-effect transistor (MOSFET).

The system of any of the preceding clauses, wherein the aircraft power source is a generator, converter, or a battery.

The system of any of the preceding clauses, wherein the aircraft electrical load is a pump, a heating element, or electrical distribution equipment.

The system of any of the preceding clauses, wherein the controller compares the measured current to a first threshold and a second threshold in determining whether to open or close the bypass switch and the shorting switch.

The system of any of the preceding clauses, wherein the controller compares the measured voltages to various thresholds in determining whether to open or close the bypass switch and the shorting switch.

The system of any of the preceding clauses, wherein the controller compares the measured current to a first threshold and a second threshold in determining whether to open or close the bypass switch and the shorting switch and wherein the controller compares the measured voltage to various thresholds in determining whether to open or close the bypass switch and the shorting switch.

The system of any of the preceding clauses, wherein a fuse is coupled electrically in series with the shorting switch.

The system of any of the preceding clauses, wherein the at least one voltage sensor comprises a first voltage sensor coupled to the input of the MEMS device and a second voltage sensor coupled between the input of the MEMS device and the output of the MEMS device.

A method, the method comprising: providing a bypass switch that is coupled electrically in parallel with a micro-electrical-mechanical system (MEMS) device, the bypass switch, when closed, providing a first alternative current path around the MEMS device, the MEMS device having an input coupled to an aircraft power source and an output coupled to an aircraft electrical load; providing a shorting switch that is coupled to the input of the MEMS device and the input of the bypass switch, wherein the shorting switch, when closed, provides a second alternative current path that returns to the aircraft power source and avoids the CPD and the aircraft electrical load; at a controller, receiving voltage measurements from at least one voltage sensor and current measurements from at least one current sensor; at the controller, based upon the voltage measurements and the current measurements, selectively opening and closing one or more of the MEMS device, the bypass switch and the shorting switch.

The method of any of the preceding clauses, wherein the shorting switch is an insulated gate bipolar transistor (IGBT) or MOSFET.

The method of any of the preceding clauses, wherein the controller compares the current measurements to a first threshold current and a second threshold current in determining whether to open or close the bypass switch and the shorting switch.

The method of any of the preceding clauses, wherein the controller compares the voltage measurements to one or more threshold voltages in determining whether to open or close the bypass switch and the shorting switch.

The method of any of the preceding clauses, wherein the controller compares the current measurements to a first threshold current and a second threshold current in determining whether to open or close the bypass switch and the shorting switch, and wherein the controller compares the voltage measurements to one or more threshold voltages in determining whether to open or close the bypass switch and the shorting switch.

Those skilled in the art will recognize that a wide variety of modifications, alterations, and combinations can be made with respect to the above-described embodiments without departing from the scope of the present disclosure, and that such modifications, alterations, and combinations are to be viewed as being within the ambit of the concepts described herein.

What is claimed is:

1. A system, the system comprising:

a circuit protection device (CPD) having an input coupled to an aircraft power source and an output coupled to an aircraft electrical load;

a shorting switch coupled to the input of the CPD, wherein the shorting switch, when closed, provides a fault current path that returns to the aircraft power source and avoids passing through the CPD and the aircraft electrical load; and a controller coupled to the CPD, the shorting switch, at least one voltage sensor, and at least one current sensor, the controller configured to:

receive voltage measurements from the at least one voltage sensor and current measurements from the at least one current sensor; and based upon the voltage measurements and the current measurements, selectively open and close one or more of the CPD and the shorting switch.

2. The system of claim 1, wherein the CPD comprises a bypass switch and a micro electrical mechanical system (MEMS) device.

3. The system of claim 1, wherein the CPD comprises a metal-oxide-semiconductor field-effect transistor (MOSFET) switch.

4. The system of claim 1, wherein the aircraft power source is a generator, a power converter, or a battery.

5. The system of claim 1, wherein the aircraft electrical load is a pump, a heating element, or electrical distribution equipment.

6. The system of claim 1, wherein the shorting switch is an insulated gate bipolar transistor (IGBT) or MOSFET.

7. The system of claim 1, wherein the at least one voltage sensor comprises a first sensor coupled to the input of the CPD and a second sensor coupled between the input of the CPD and the output of the CPD.

8. A system, the system comprising:

a micro-electrical-mechanical system (MEMS) device having an input coupled to an aircraft power source and an output coupled to an aircraft electrical load;

a bypass switch coupled electrically in parallel with the MEMS device, the bypass switch, when closed, providing a first alternative current path around the MEMS device;

a shorting switch coupled to the input of the MEMS device and an input of the bypass switch, wherein the shorting switch, when closed, provides a second alternative current path that returns to the aircraft power source and avoids the MEMS device and the aircraft electrical load; and a controller coupled to the bypass switch, the shorting switch, at least one voltage sensor, the MEMS device, and at least one current sensor, the controller configured to:

receive voltage measurements from the at least one voltage sensor and current measurements from the at least one current sensor; and based upon the voltage measurements and the current measurements selectively open and close one or more of the MEMS device, the bypass switch and the shorting switch.

9. The system of claim 8, wherein the bypass switch is a metal-oxide-semiconductor field-effect transistor (MOSFET).

10. The system of claim 8, wherein the shorting switch is an insulated gate bipolar transistor (IGBT) or metal-oxide-semiconductor field-effect transistor (MOSFET).

11. The system of claim 8, wherein the aircraft power source is a generator, a power converter, or a battery.

12. The system of claim 8, wherein the aircraft electrical load is a pump, a heating element, or electrical distribution equipment.

13. The system of claim 8, wherein the controller compares the current measurements to a first threshold and a second threshold in determining whether to open or close the bypass switch and the shorting switch.

14. The system of claim 8, wherein the at least one voltage sensor comprises a first voltage sensor coupled to the input of the MEMS device and a second voltage sensor coupled between the input of the MEMS device and the output of the MEMS device.

15. The system of claim 8, wherein a fuse is coupled electrically in series with the shorting switch.

16. A method, the method comprising:

providing a bypass switch that is coupled electrically in parallel with a micro-electrical-mechanical system (MEMS) device, the bypass switch, when closed, providing a first alternative current path around the MEMS device, the MEMS device having an input coupled to an aircraft power source and an output coupled to an aircraft electrical load;

providing a shorting switch that is coupled to the input of the MEMS device and the input of the bypass switch, wherein the shorting switch, when closed, provides a second alternative current path that returns to the aircraft power source and avoids the MEMS device and the aircraft electrical load;

at a controller, receiving voltage measurements from at least one voltage sensor and current measurements from at least one current sensor; and at the controller, based upon the voltage measurements and the current measurements, selectively opening and closing one or more of the MEMS device, the bypass switch and the shorting switch.

17. The method of claim 16, wherein the shorting switch is an insulated gate bipolar transistor (IGBT) or metal-oxide-semiconductor field-effect transistor (MOSFET).

18. The method of claim 16, wherein the controller compares the current measurements to a first threshold current and a second threshold current in determining whether to open or close the bypass switch and the shorting switch.

19. The method of claim 16, wherein the controller compares the voltage measurements to one or more threshold voltages in determining whether to open or close the bypass switch and the shorting switch.

20. The method of claim 16, wherein the controller compares the current measurements to a first threshold current and a second threshold current in determining whether to open or close the bypass switch and the shorting switch, and wherein the controller compares the voltage measurements to one or more threshold voltages in determining whether to open or close the bypass switch and the shorting switch.

* * * * *